United States Patent [19]

Coppens et al.

[11] Patent Number: 5,308,511
[45] Date of Patent: May 3, 1994

[54] SOLVENT-BASED WATER- AND OIL-REPELLENT TREATING AGENT

[75] Inventors: Dirk Coppens, Antwerp, Belgium; Makoto Nagase; Masahiro Ashizawa, both of Sagamihara, Japan

[73] Assignee: Minnesota Mining and Manufacturing Company, St. Paul, Minn.

[21] Appl. No.: 985,307

[22] Filed: Dec. 4, 1992

[51] Int. Cl.$^5$ .................. D06M 10/08; C09D 5/20; C08K 5/34

[52] U.S. Cl. ...................... 252/8.6; 252/8.9; 8/115.64

[58] Field of Search ............. 8/115.64; 252/8.6, 8.9

[56] References Cited

U.S. PATENT DOCUMENTS

| | | | |
|---|---|---|---|
| 3,341,497 | 9/1967 | Sherman | 260/72 |
| 3,445,491 | 5/1969 | Pacini | 260/399 |
| 3,470,124 | 9/1969 | Van Eygen et al. | 260/29.6 |
| 3,544,537 | 12/1970 | Brace | 260/89.5 |
| 3,546,187 | 12/1970 | Tandy, Jr. | 260/88.76 |
| 4,215,205 | 7/1980 | Landucci | 525/331 |
| 4,426,466 | 1/1984 | Schwartz | 523/455 |
| 4,468,527 | 8/1984 | Patel | 564/96 |
| 4,540,497 | 9/1985 | Chang | 252/8.8 |
| 4,566,981 | 1/1986 | Howells | 252/8.8 |
| 4,861,501 | 8/1989 | Pfeifer | 252/8.6 |
| 5,084,191 | 1/1992 | Nagase et al. | 252/8.6 |
| 5,132,028 | 7/1992 | Nagase et al. | 252/8.6 |
| 5,153,046 | 10/1992 | Murphy | 428/96 |
| 5,156,780 | 10/1992 | Kenisberg et al. | 264/22 |

OTHER PUBLICATIONS

Banks, Ed., Organofluorine Chemicals and Their Industrial Applications, Ellis Horwood Ltd., Chichester, England, 1979, pp. 226–234.

*Primary Examiner*—Paul Lieberman
*Assistant Examiner*—Michael P. Tierney
*Attorney, Agent, or Firm*—Gary L. Griswold; Walter N. Kirn; Robert H. Brink

[57] ABSTRACT

Compositions for imparting water- and oil-repellency to fabrics are provided. They contain a mineral spirits solution of a fluorchemical water- and oil-repellent agent, zirconium carboxylic acid ester, and alkenyl succinic anhydride.

12 Claims, No Drawings

SOLVENT-BASED WATER- AND OIL-REPELLENT TREATING AGENT

This invention relates to a fluorochemical-type, water- and oil-repellent treating agent for imparting useful and improved properties to fibrous substrates such as silk fabric. In another aspect, this invention relates to a method of using such agent to treat such substrates, and in another aspect it relates to the so-treated substrates.

The use of various fluorochemical compositions on fibers and fibrous substrates, such as textiles, paper, and leather, to impart oil and water repellency is known— see, for example, Banks, Ed., *Organofluorine Chemicals and Their Industrial Applications*, Ellis Horwood Ltd., Chichester, England, 1979, pp. 226-234. Such fluorochemical compositions are, for example, fluorochemical guanidines (U.S. Pat. No. 4,540,497, Chang et al.), compositions of cationic and noncationic fluorochemicals (U.S. Pat. No. 4,566,981, Howells), compositions containing fluorochemical carboxylic acid and epoxidic cationic resin (U.S. Pat. No. 4,426,466, Schwartz), and fluoroaliphatic alcohols (U.S. Pat. No. 4,468,527, Patel). U.S. Pat. No. 4,215,205 (Landucci) discloses combinations of fluorochemical vinyl polymer and carbodiimide in compositions said to impart durable water- and oil-repellency to textiles, some of the carbodiimides disclosed containing fluoroaliphatic groups.

U.S. Pat. No. 5,132,028 (Nagase et al.) discloses compositions for imparting water- and oil-repellency to fabrics such as silk, said compositions containing a fluorochemical-type, water- and oil-repellent agent, a carbodiimide, and at least one component selected from the group consisting of plasticizer, metal alcoholate or ester, zirconium salt, alkylketen dimer, aziridine, and alkenyl succinic anhydride.

Though there are a number of commercial water- and oil-repellent compositions comprising a fluorochemical polymer that are useful to impart properties to various fibrous substrates, their use in treating substrates such as 100% silk (or all-silk) fabrics used in manufacturing clothes, such as kimonos, has not been as satisfactory as that desired. It is generally difficult to obtain satisfactory water- and oil-repellency of silk fabrics with these currently-used fluorochemical compositions because most of such fabrics usually have on them varying amounts of residual chemicals, such as starch, dye, softener, anti-bacterial agents, and surfactants. And those currently-used compositions generally are used in the form of chlorofluorocarbon or chlorinated solvent-solutions of the fluorochemical polymer; the use of such solvents will need to be discontinued because of their contribution to the atmospheric ozone depletion problem.

Briefly, in one aspect, the present invention provides a water- and oil-repellent treating agent or composition for fibrous substrates such as silk, said treating agent comprising or consisting essentially of a solution in mineral spirits of fluorochemical-type, water- and oil-repellent agent (such as organic solvent-soluble fluoroaliphatic radical-containing polyacrylate), zirconium carboxylic acid ester, and alkenyl succinic anhydride. The treating agent is applied to the fibrous substrate by contacting it with the treating agent, for example, by immersing it in a bath of the treating agent, and the treated substrate then treated to remove the mineral spirits therefrom, for example, by volatilization.

The water- and oil-repellent treating agent of this invention imparts desirable water- and oil-repellency to the fibrous substrates treated therewith (such as silk fabrics, including those containing residual processing chemicals used in its manufacture) without adversely affecting other desirable properties of the substrate, such as soft hand (or feeling), and the treating agent does not cause the treated fabric to yellow upon exposure to sunlight or other ultra violet radiations. And the mineral spirits used as a solvent for the fluorochemical, zirconium compound, and anhydride components (solutes) is a substance that does not contribute to the ozone depletion problem.

Any of the known fluoroaliphatic radical-containing agents useful for the treatment of fabrics to obtain repellency of oil- and water-born stains can be used as the fluorochemical component in the treating agent of this invention if such substance is organic solvent-soluble, that is, if the fluorochemical is soluble in the mineral spirits used as a solvent and the resulting solution is clear. Such fluorochemicals are, for example, the fluoroaliphatic-radical-containing polyacrylates, polymethacrylates, and the like. Such known agents include, for example, those described in U.S. Pat. No. 3,546,187 (Tandy); U.S. Pat. No. 3,544,537 (Brace); U.S. Pat. No. 3,470,124 (Van Eygen et al.); U.S. Pat. No. 3,445,491 (Pacini); and U.S. Pat. No. 3,341,497 (Sherman, et al).

The fluorochemical component is preferably a copolymer of one or more fluoroaliphatic radical-containing acrylates or methacrylates monomers and one or more fluorine-free (or hydrocarbon) terminally ethylenically-unsaturated co-monomers. Classes of the fluorochemical monomer can be represented by the formulas

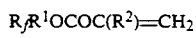

$$R_fR^1OCOC(R^2)=CH_2 \qquad \text{I}$$

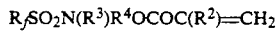

$$R_fSO_2N(R^3)R^4OCOC(R^2)=CH_2 \qquad \text{II}$$

where $R_f$ is a fluoroaliphatic radical;
$R^1$ is an alkylene with, for example, 1 to 10 carbon atoms, e.g. methylene or ethylene, or is —CH$_2$CH(OR)CH$_2$—, where R is hydrogen or COCH$_3$;
$R^2$ is hydrogen or methyl;
$R^3$ is hydrogen or an alkyl with, for example, 1 to 10 carbon atoms, e.g. methyl or ethyl; and
$R^4$ is an alkylene with, for example, 1 to 10 carbon atoms, e.g. methylene or ethylene.

The fluoroaliphatic radical, called $R_f$ for brevity, is a fluorinated, stable, inert, preferably saturated, nonpolar, monovalent aliphatic radical. It can be straight chain, branched chain, or cyclic or combinations thereof. It can contain catenary hetero atoms, bonded only to carbon atoms, such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least 3 carbon atoms, preferably 3 to 10 carbon atoms, and preferably contains about 40% to about 78% fluorine by weight, more preferably about 50% to about 78% fluorine by weight. The terminal portion of the $R_f$ radical is a perfluorinated moiety, which will preferably contain at least 7 fluorine atoms, e.g., CF$_3$CF$_2$CF$_2$—, (CF$_3$)$_2$CF—, F$_5$SCF$_2$—. The preferred $R_f$ radicals are fully or substantially fluorinated and are preferably those perfluorinated aliphatic radicals of the formula $C_nF_{2n+1}-$ where n is 3 to 10.

Representative monomers of formulas I and II are:

$CF_3(CF_2)_4CH_2OCOC(CH_3)=CH_2$

$CF_3(CF_2)_6(CH_2)_2OCOC(CH_3)=CH_2$

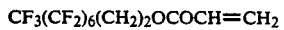
$CF_3(CF_2)_6(CH_2)_2OCOCH=CH_2$

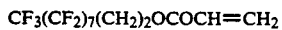
$CF_3(CF_2)_7(CH_2)_2OCOCH=CH_2$

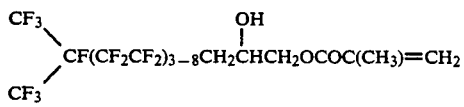

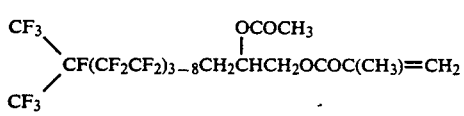

$CF_3(CF_2)_7SO_2N(CH_2)_2OCOCH=CH_2$ (with $C_2H_5$ on N)

$CF_3CF_2(CF_2CF_2)_{2-8}(CH_2CH_2)_2OCOCH=CH_2$

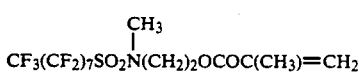
$CF_3(CF_2)_7SO_2N(CH_2)_2OCOC(CH_3)=CH_2$ (with $CH_3$ on N)

$(CF_3)_3C(CF_2CF_2)_2CH_2OCOCH=CH_2$

Co-monomers which can be copolymerized with the above-described fluoroaliphatic radical-containing monomers are, for example, octadecylmethacrylate, 1,4-butanediol diacrylate, acrylonitrile, diacetone acrylamide, N-methylolacrylamide, acrylamide, vinyl acetate, vinyl chloride, and vinylidene chloride.

The relative weight ratio of the fluoroaliphatic monomer(s) to the hydrocarbon co-monomer(s) can vary as is known in the art, and generally the weight ratio of them will be 50-95:50-5.

Examples of such fluorochemical copolymers are a copolymer of 65 weight percent. $C_8F_{17}SO_2N(CH_3)CH_2CH_2O_2CC(CH_3)=CH_2$ and 35 Weight percent $C_{18}H_{37}O_2CC(CH_3)=CH_2$, and a copolymer of 65 Weight percent $C_8F_{17}SO_2N(CH_3)CH_2C-H_2O_2CC(CH_3)=CH_2$, 14 weight percent $C_{18}H_{37}O_2CC(CH_3)=CH_2$, 20 weight percent $CH_2=CCl_2$, and one weight percent 1,4-butanediol diacrylate.

Suitable alkenyl succinic anhydrides useful as the anhydride component in the treating agent of this invention are those which are soluble in the mineral spirits solvent. A class of such anhydrides can be represented by the formula

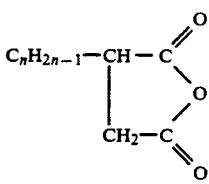

III where n is an integer of 6 to 18, and $C_nH_{2n-1}$ is preferably a straight chain. Representative anhydrides which can be used are n-octenyl succinic anhydride n-hexadecenyl succinic anhydride, octadecenyl succinic anhydride (commercially available as Paberus ™ SS-100, Paberus ™ NP, and Paberus ™ MS-100), and mixtures thereof.

A class of suitable zirconium carboxylic acid esters (or zirconyl or zirconium carboxylates) which can be used in the treating agents of this invention are the organic solvent-soluble zirconium esters of monocarboxylic acids represented by the formula

$ZrO(O_2CC_nH_{2n+1})_2$   IV where n is an integer of 4 to 18 and preferably is about 8. Representative examples of such compounds are, for example, zirconium butylate, zirconium valerate, zirconium hexylate, zirconium pentanate, zirconium octylate, zirconyl stearate, and mixtures thereof. A commercially available product which can be used is "Zirconyl Octoate", a mixture of about 50% zirconium 2-ethylhexylate and about 50% mineral terpene.

The mineral spirits used as a solvent for the three essential components or solutes can be obtained from a number of commercially available sources under various trademarks, such as "Exxol D40", "Amsco", "Gettysolve-S", "Gettysolve-S-66", and "Shell 143-EC". These products generally contain about 35 to 85 weight percent paraffins, 15 to 55 weight percent cycloparaffins, and 0 to 15 weight percent aromatics. Generally not less than 10% of such product distills below 175° C. and not less than 90% of which distills below 220° C. The mineral spirits solution of the three essential components may also contain relatively small amounts of other organic solvents normally used in preparing such components and it is not necessary to remove those residual solvents in making up the mineral spirits solution used in this invention. The mineral spirits solutions are generally clear in that the three essential components are soluble therein. If desired, the treating solution can contain other desirable soluble components, such as plasticizers and silicone water repellent oils and agents to increase soft hand and repellency.

The relative amounts and concentrations of the three essential components or solutes of the mineral spirits solutions of this invention can vary, depending on the particular components selected and the degrees of water- and oil-repellency and softness desired. Generally, the weight ratio of the fluorochemical component to the anhydride component to be used will be 10:1 to 10:20, preferably 10:3 to 10:10, and the weight ratio of the fluorochemical component to the zirconium component to be used will be 10:0.5 to 10:10, preferably about 10:1 to 10:5. The concentrations in the treating solution of the components (present in said relative weight ratios), expressed in terms of their total non-volatile solids, is typically, but not limited to, about 0.2 to 2 weight percent solids. The final weight percent solids on the fibrous substrate after treatment and removal of solvent from the fabric is sufficient to impart the desired repellency and generally can be 0.05 to 3% weight percent.

The treating solutions of this invention can be made by merely mixing the three essential components with the mineral spirits solvent. Preferably, the relative amounts of solvent and the components are such as to prepare a concentrated solution and the latter is then diluted, for example, twenty-fold, to prepare the treating solution for application to the fibrous substrate.

The treatment of the fibrous substrates using the water- and oil-repellent treating agent of the present invention can be carried out by using well-known methods such as dipping, spraying, padding, knife coating, roll coating or the like, and removing or volatilizing the solvent from the treated substrate, for example, by heating the same at 20° C. to 80° C.

Objects and advantages of this invention are illustrated in the Examples described below.

In the Examples, numerical values related to compositions of the water- and oil-repellent agent are based on weight unless otherwise noted. Water and oil-repellency data shown in the Examples are based on the following methods of measurement and evaluation criteria.

The water repellency was measured by the spraying method according to the Japan Industrial Standard ("JIS") L-1092, and spray evaluation was measured on a scale of 0 to 100 (see Table 1).

TABLE 1

| Water repellency number | Condition or appearance of treated substrate |
|---|---|
| 100 | Without adhered wetting or swelling on the surface |
| 90 | Exhibiting slight adhered wetting and swelling on the surface |
| 80 | Exhibiting partial wetting and swelling on the surface |
| 70 | The surface was swollen |
| 50 | The whole surface was swollen |
| 0 | The surface was wholly swollen to the back of the sample |

Oil repellency was measured by a method according to the AATCC-118-1981. Test liquids of different surface tension are placed on the treated substrate sample and the sample is rated according to the test liquid of lowest surface tension that does not penetrate the sample. A treated fabric that is not penetrated by Nujol TM mineral oil, having the lowest penetrating power, is rated as 1, and a treated fabric that is not penetrated by heptane, having the highest penetrating power in test oils, is rated as 8. Table 2 sets forth the oil repellency rating scheme.

TABLE 2

| Oil repellency number | Surface tension of test liquid (dyne/cm) | Standard test liquid |
|---|---|---|
| 1 | 31.45 | Nujol TM |
| 2 | 29.6 | 65/35 Nujol TM /n-hexadecane |
| 3 | 27.3 | n-hexadecane |
| 4 | 26.35 | n-tetradecane |
| 5 | 24.7 | n-dodecane |
| 6 | 23.5 | n-decane |
| 7 | 21.4 | n-octane |
| 8 | 19.75 | n-heptane |

In the Examples, samples of two types of silk fabric were treated with various mineral spirit treatment solutions (described below) using an application technique (sometimes called "dip-nip") comprising padding the fabric with the solution and the treated fabric samples were then heated in an 80° C. air oven for 5 min., after which the properties were measured and the treated fabric samples evaluated. The results of evaluation are set forth in Tables 3 and 4.

A fluoroaliphatic radical-containing polyacrylate, copolymer A, used in the Examples was a reaction product of 65 wt % of a perfluoroalkylmethacrylate monomer, $C_8F_{17}SO_2N(CH_3)CH_2CH_2O_2CC(CH_3)=CH_2$, and 35 wt % of an alkylmethacrylate monomer, $C_{18}H_{37}O_2CC(CH_3)=CH_2$, prepared by the method described in example 6 of U.S. Pat. No. 3,341,497 (Sherman and Smith). A stock solution of copolymer A was made up, containing 25% copolymer solids, 18 wt % ethyl acetate, and 57 wt % heptane.

Another fluoroaliphatic radical-containing polyacrylate, copolymer B, used in the Examples, was made in a similar manner to copolymer A except that the 65 wt % perfluoroalkylmethacrylate was copolymerized with 14 wt % of the alkylmethacrylate monomer, 20 wt % vinylidene chloride, and 1 wt % 1,4-butanediol diacrylate. Copolymer B was made as a stock solution containing 30 wt % copolymer solids and 70 wt % methylethylketone.

The mineral spirits used in the Examples was that sold as "Exxol D40." The treating solution or agent of each Example described below was made by diluting or letting down 20-fold with mineral spirits a concentrate of the fluorochemical, ester, and anhydride components in mineral spirits. The concentrate of Example 1 was made by blending 40 parts of the stock solution of copolymer A with 5.0 parts PABERUS TM NP alkenyl succinic anhydride, 5.0 parts of Zirconyl Octoate TM, and 50 parts mineral spirits.

The treating agent of Example 2 was made in the same manner as Example 1 except 33.3 parts of copolymer B stock solution was used in place of copolymer A stock solution and 56.7 parts of mineral spirits were used instead of 50 parts to make the concentrate.

The treating solution of Example 3 was made in the same manner as Example 2 except 1.0 part Zirconyl Octoate TM and 60.7 parts mineral spirits were used to make the concentrate.

The treating solution of Example 4 was made in the same manner as Example 2 except 15 parts Zirconyl Octoate TM and 51.7 parts mineral spirits were used to make the concentrate.

The treating solution of Example 5 was made in the same manner as Example 2 except 0.5 parts Zirconyl Octoate TM and 61.2 parts mineral spirits were used to make the concentrate.

For purposes of comparison, other treating solutions, described below, were used in treating silk fabric samples and the comparison data are also set forth in Tables 3 and 4.

The treating solution of Comparative Example C1 was made in the same manner as Example 2 except 25 parts Zirconyl Octoate TM and 36.7 parts mineral spirits were used to make the concentrate.

The treating solution of Comparative Example C2 was made as in Example 1 but without the Zirconyl Octoate TM and increasing the mineral spirits to 55 parts in making the concentrate.

The treating solution of Comparative Example C3 was made as in Comparative Example C2 except the amount of PABERUS NP was 20 parts and the amount of mineral spirits was 40 parts in making the concentrate.

The treating solution of Comparative Example C4 was made as in Comparative Example C3 except the PABERUS NP amount was 25 parts and the mineral spirits amount was 35 parts in making the concentrate.

The treating solution of Comparative Example C5 was made as in Comparative Example C2 except 33.3 parts copolymer B stock solution was used instead of copolymer A stock solution and the mineral spirits amount was 61.7 parts in making the concentrate.

The treating solution of Comparative Example C6 was made as in Example 1 except that, in making the concentrate, 4.0 parts PABERUS NP and 49.5 parts mineral spirits were used and 1.5 parts UCARLNK XL-27HS carbodiimide was added. This treating solution was not tested on fabric because a cloudy rather than a clear solution was obtained.

The treating solution of Comparative Example C7 was made by blending 40 parts of copolymer A stock solution and 60 parts mineral spirits in making the concentrate.

The treating solution of Comparative Example C8 was made by blending 33.3 parts of copolymer B stock solution and 66.7 parts mineral spirits in making the concentrate.

The treating solution of Comparative Example C9 was made as in Comparative Example C2 except the PABERUS NP added was 0.5 parts and the amount of mineral spirits was 59.5 parts in making the concentrate.

The treating solution of Comparative Example C10 was made as in Comparative Example C2 except the PABERUS NP added was 1.0 part and the amount of mineral spirits was 59 parts in making the concentrate.

Table 3 represents the results obtained when each of the treatment solutions were applied to a 100% silk kimono inner fabric (a JIS standard fabric for color fastness) in an amount sufficient to provide a 54 weight percent wet pickup.

TABLE 3

| Example | Water repellency | Oil repellency | Hand** | Yellow appearance |
|---|---|---|---|---|
| 1 | 100− | 5 | 1 | none |
| 2 | 100 | 5 | 1 | none |
| 3 | 100− | 5 | 1 | none |
| 4 | 100 | 4 | 1 | none |
| 5 | 90+ | 5 | 1 | none |
| C1 | * | * | * | * |
| C2 | 90+ | 5 | 1 | none |
| C3 | 100− | 4 | 1 | slight |
| C4 | 100− | 3 | 4 | severe |
| C5 | 90+ | 5 | 1 | none |
| C6 | * | * | * | * |
| C7 | 70+ | 3 | 3 | none |
| C8 | 80 | 4 | 2 | none |
| C9 | 80 | 3 | 2 | none |
| C10 | 90 | 4 | 1 | none |

*Not measured because cloudy solution obtained
**The "hand" rating scale used was:
1 Softer than 100% silk fabric before treatment
2 The same as 100% silk fabric before treatment
3 Slightly harder than 100% silk fabric before treatment
4 More slippery hand than 100% silk fabric before treatment The treatment solutions were also applied to a 100% silk kimono fabric (a print dyed fabric called "kyoyuzen" in Japan), each solution being applied in an amount sufficient to provide a wet pickup of 65 wt %. The results are reported in Table 3.

TABLE 4

| Example | Water repellency | Oil repellency |
|---|---|---|
| 1 | 100− | 5 |
| 2 | 100 | 5 |
| 3 | 90+ | 5 |
| 4 | 100 | 4 |
| 5 | 90 | 5 |
| C1 | * | * |
| C2 | 80+ | 5 |
| C3 | 90− | 4 |
| C4 | 90− | 3 |
| C5 | 90 | 5 |

TABLE 4-continued

| Example | Water repellency | Oil repellency |
|---|---|---|
| C6 | * | * |
| C7 | 70 | 3 |
| C8 | 70 | 4 |
| C9 | 70 | 3 |
| C10 | 80 | 4 |

The data of Tables 3 and 4 show that the treating agents of this invention impart desirable water- and oil-repellency to the silk fabric and, as shown by Table 3, without adversely affecting the hand and did not cause the treated silk fabric to yellow.

Various modifications and alterations of this invention will be apparent to those skilled in the art without departing from the scope and spirit of this invention and this invention should not be restricted to that set forth herein for illustrative purposes.

We claim:

1. A mineral spirits solution consisting essentially of components that are soluble in mineral spirits and comprising a fluorochemical water-and oil-repellent agent, zirconium carboxylic acid ester, and alkenyl succinic anhydride.

2. The mineral spirits solution of claim 1 wherein said fluorochemical agent is a fluoroaliphatic radicalcontaining polyacrylate or polymethacrylate.

3. The mineral spirits solution of claim 1 wherein said fluorochemical agent is a copolymer of $C_8F_{17}SO_2N(CH_3)CH_2CH_2O_2CC(CH_3)=CH_2$ and octadecylmethacrylate, and, optionally, vinylidene chloride and 1,4-butanediol diacrylate.

4. The mineral spirits solution of claim 1 wherein said zirconium ester is selected from the group consisting of zirconium butylate, zirconium valerate, zirconium hexylate, zirconium pentanate, zirconium octylate, and zirconyl stearate, and mixtures thereof.

5. The mineral spirits solution of claim 1 wherein said alkenyl succinic anhydride is octenyl succinic anhydride, hexadecenyl succinic anhydride, or octadecenyl succinic anhydride, or mixtures thereof.

6. Method of treating a fibrous substrate comprising:
   (A) contacting said fibrous substrate with a mineral spirits solution consisting essentially of components that are soluble in mineral spirits comprising a fluorochemical water-and oil-repellent agent, zirconium carboxylic acid ester, and alkenyl succinic anhydride
   (B) removing solvent from the resulting treated substrate.

7. The method of claim 6 wherein said fluorochemical agent is a fluoroaliphatic radical-containing polyacrylate or polymethacrylate.

8. The method of claim 6 wherein said zirconium ester is selected from the group consisting of zirconium butylate, zirconium valerate, zirconium hexylate, zirconium pentanate, zirconium octylate, zirconyl stearate, and mixtures thereof.

9. The method of claim 6 wherein said alkenyl succinic anhydride is a octenyl succinic anhydride, hexadecenyl succinic anhydride or octadecenyl succinic anhydride, or mixtures thereof.

10. The method of claim 6 wherein said fibrous substrate is silk.

11. Fibrous substrate treated with the mineral spirits solution of claim 1.

12. Silk fabric treated with the mineral spirits solution of claim 1.

* * * * *